United States Patent
Abe et al.

[19]

[11] Patent Number: 6,130,744
[45] Date of Patent: *Oct. 10, 2000

[54] OPTICAL DISK DISCRIMINATING METHOD, INCLUDING MEMORY STORAGE, FOR AUTOMATIC MULTIPLE-DISK CHANGER

[75] Inventors: Kenji Abe; Tatsumaro Yamashita, both of Miyagi-ken; Isao Asano, Fukushima-ken; Shoichiro Saito, Miyagi-ken, all of Japan

[73] Assignee: Alps Electric Co., Ltd., Tokyo, Japan

[ * ] Notice: This patent is subject to a terminal disclaimer.

[21] Appl. No.: 09/056,213

[22] Filed: Apr. 7, 1998

[30] Foreign Application Priority Data

Apr. 17, 1997 [JP] Japan .................................. 9-100235
Apr. 17, 1997 [JP] Japan .................................. 9-100252
May 30, 1997 [JP] Japan .................................. 9-141724

[51] Int. Cl.$^7$ ............................. G01N 21/00; G11B 17/22
[52] U.S. Cl. ............................................................. 356/73
[58] Field of Search ................................. 369/36, 34, 58; 356/73

[56] References Cited

U.S. PATENT DOCUMENTS

| | | | |
|---|---|---|---|
| 5,357,495 | 10/1994 | Solhjell | 369/34 |
| 5,581,522 | 12/1996 | Sibuya et al. | 369/36 |
| 5,633,842 | 5/1997 | Nishida et al. | 369/32 |
| 5,831,947 | 11/1998 | Okazaki et al. | 369/34 |
| 5,886,961 | 3/1999 | Yamashita et al. | 369/34 |
| 5,903,538 | 5/1999 | Fujita et al. | 369/178 |
| 5,914,929 | 6/1999 | Kato et al. | 369/75.2 |
| 5,917,791 | 6/1999 | Tsuchiya et al. | 369/58 |

FOREIGN PATENT DOCUMENTS

| | | |
|---|---|---|
| 265 167 A2 | 10/1987 | European Pat. Off. . |
| 294 490 A1 | 12/1987 | European Pat. Off. . |
| 130391 | 12/1989 | European Pat. Off. . |
| 2023564 | 1/1990 | European Pat. Off. . |
| 470 807 A1 | 8/1991 | European Pat. Off. . |
| 6131855 | 5/1994 | European Pat. Off. . |
| 694 923 A1 | 1/1996 | European Pat. Off. . |
| 0 717 405 | 6/1996 | European Pat. Off. . |
| 9212984 | 8/1997 | European Pat. Off. . |

*Primary Examiner*—Frank G. Font
*Assistant Examiner*—Philip Natividad
*Attorney, Agent, or Firm*—Brinks Hofer Gilson & Lione

[57] ABSTRACT

Since disks of the same type are loaded in a disk device using a conventional disk changer scheme, the disk device is not versatile as a peripheral device of a computer. ROM disks and RAM disks are mixed and stored in a magazine, and this magazine is loaded in the disk device. In the disk device, a tray is identified in step by a detector arranged on the tray to check whether the tray be a ROM disk or a RAM disk. Thereafter, discrimination information is recorded, together with the contents information, on an IC memory arranged on the magazine in step. Thereafter, when the magazine is loaded again, the discrimination information is read from the IC memory, and an operation corresponding to each disk is performed.

8 Claims, 5 Drawing Sheets

OPTICAL DISK DISCRIMINATING METHOD, INCLUDING MEMORY STORAGE, FOR AUTOMATIC MULTIPLE-DISK CHANGER

BACKGROUND OF THE INVENTION

1. Field of the Invention

The present invention relates to a disk discriminating method which can discriminate the types of disks loaded in a disk device in which different types of disks such as a CD and a DVD are to be loaded.

2. Description of the Related Art

As a conventional disk device in which plural disks are loaded, a diskchanger using a magazine loading method is known. However, in many conventional diskchangers, plural disks of the same type such as CDs or DVDs are stored.

However, when the above disk device is used as one type of a storage device serving as a peripheral device of a computer, only disks of the same type such as CDs or DVDs can be exchanged to each other to be driven. For this reason, only reading from these disks can be performed, and the applications of the above device can be limited to specific applications.

The present inventor proposes the followings in Japanese Patent Application No. 8-252829. That is, ROM disks and RAM disks are stored in the same magazine (package), and one of the disks is selected at any time to make not only reading of data but also writing of data possible.

However, when ROM disks and RAM disks which are mixed with each other are stored in one magazine (package), if these disks include disks which are ROM or RAM disks but are different in type or recording format, the disk s in the magazine must be picked one by one every loading of the magazine, and the type of the picked disk must be discriminated. A long standby time is required at the start of operation.

When the types of disks in the magazine are to be discriminated, after each disk is drawn from the magazine, the recording format of the disk can also be checked while signals recorded on the disk are actually read. According to this method, the types of disks which can be discriminated are limited to specific types, efficient determination for the types of respective disks which are finely classified is limited.

In addition, in some combination of a RAM disk and ROM disk, the same laser beam can be irradiated on one of these disks without any problem, but adversely affects the other of these disks. From this point of view, at least, it must be recognized in advance whether a target disk be a RAM disk or a ROM disk.

SUMMARY OF THE INVENTION

The present invention has been made in consideration of the above circumstances, and has as the first object to provide a disk discriminating device in which once the types of disks are discriminated, the discrimination information is converted into a database to make it possible to record the database on a magazine itself, and disk discrimination after loading of the magazine is made easy.

It is the second object of the present invention to provide a disk discriminating device in which once the types of disks are discriminated, the discrimination information is converted into a database to make it possible to store the database together with a type code of a magazine, and disk discrimination after loading of the magazine is made easy.

It is the third object of the present invention to provide a disk discriminating method in which, in a disk device in which a magazine having plural types of disks mixed and stored in the magazine is loaded, the types of the respective disks can be efficiently discriminated, and, at least, rough classification for checking whether a target disk be a RAM disk or a ROM disk can be recognized in advance, so that drive which adversely affects the recording surface of the disk can be prevented.

<Means for Achieving First Object>

The present invention is characterized in that, in a disk discriminating method in a disk device in which a magazine having plural types of disks which can be stored in the magazine is loaded, each disk is drawn from the magazine, the type of the corresponding disk is discriminated by at least one method selected from detection of a reflectance of a recording surface of the disk, reading of signals recorded on the disk, and detection of a thickness of a substrate in which the recording surface of the disk is formed, and type information of the respective disks which can be obtained by this discrimination is recorded on a storage section arranged in the magazine.

In the above description, contents information recorded on the disk is preferably read, and the contents information is preferably recorded on the storage section together with the type information of each disk.

The storage section may be a storage element attached to the magazine, and a recording region of a recordable disk stored in the magazine is partially used as the storage section.

After information is recorded on the storage section, the storage section is accessed in first when the magazine is loaded, and a disk selecting operation is performed on the basis of the information stored in the storage section.

In the present invention described above, when the magazine is loaded in the disk device, and magazine drive software is started by an Icon on the screen of, e.g., a computer, a storage section arranged in the magazine or a predetermined disk in the magazine is accessed to detect whether the magazine be set in an initial state or not. If the magazine is set in an initial state, a disk is drawn from the magazine one by one, the type of the disk is determined, and the disk identification information is recorded on the storage element or in a recording region of a predetermined disk. Discrimination of the type of this disk is performed by at least one method selected from detection of the reflection of the recording surface of the disk, reading of signals recorded on the disk, and detection of the thickness of a substrate in which the recording surface of the disk is formed. The reading of signals is performed in such a manner that TOC, FAT, and other data recorded on the disk are reproduced to detect whether the data can be demodulated by a predetermined modulation scheme. The reading is also performed by the following method. That is, detection light from an optical head is scanned in the radial direction of the disk, and a track pitch or the like is detected by a focus error detector.

Preferably, contents information (Volume Descripter) recorded in a TOC region of each disk or contents information recorded in a FAT region are converted into a database together with the type information of each disk, and the database is recorded on the storage element or a predetermined disk.

Thereafter, when this magazine is loaded, the storage element or the predetermined disk is accessed the moment the magazine drive software is started, information serving as the database is read and then stored in a memory in the disk device or the memory of a computer main body. A disk selecting/starting operation is performed on the basis of the information.

When any disk in the magazine is exchanged, and the magazine drive software is started, an operation for updating recorded contents in the storage element or the recording region of the disk is performed. With this operation, the identification of the disks and the reading of the contents information are performed again, new information is converted into a database, and the database is recorded on the storage element or a predetermined disk.

<Means for Achieving Second Object>

According to the present invention, a disk discriminating method in a disk device in which a magazine having plural types of disks which can be stored in the magazine is loaded is characterized in that each disk is drawn from the magazine, the type of the corresponding disk is discriminated by at least one method selected from detection of a reflectance of a recording surface of the disk, reading of signals recorded on the disk, and detection of a thickness of a substrate in which the recording surface of the disk is formed, and type information of the respective disks which can be obtained by this discrimination is stored, together with an identification code obtained from the magazine, in a storage section arranged in a region other than the magazine.

In the above description, contents information recorded on the disk is preferably read, and the type information and the contents information of the disks are preferably recorded on the storage section together with the identification code.

The identification code is read from a storage element attached to the magazine, or the identification code is read from an ID mark attached to the magazine.

The storage section is arranged in the disk device. As the storage section, a memory in a host computer may be used.

After information is recorded on the storage section, the identification code of the magazine is read in first when the magazine is loaded, and information corresponding to the identification code is extracted from the storage section, so that a disk selecting operation may be performed on the basis of the information extracted from the storage section.

In the present invention described above, when the magazine is loaded in the disk device, and magazine drive software is started by an Icon on the screen of, e.g., a computer, the identification code of the magazine is read from a storage element arranged in the magazine or the ID mark attached to the magazine. The identification information of the disks in the magazine is stored in the storage section in the disk device or the storage section of the host computer together with the identification code.

Discrimination of the type of the disk is performed by at least one method selected from detection of the reflection of the recording surface of the disk, reading of signals recorded on the disk, and detection of the thickness of a substrate in which the recording surface of the disk is formed. The reading of signals is performed in such a manner that TOC, FAT, and other data recorded on the disk are reproduced to detect whether the data can be demodulated by a predetermined modulation scheme. The reading is also performed by the following method. That is, detection light from an optical head is scanned in the radial direction of the disk, and a track pitch or the like is detected by a focus error detector.

Preferably, contents information (Volume Descripter) recorded in a TOC region of each disk, contents information recorded in a FAT region, and disk type information are converted into a database together with the identification code of the magazine, and the database is recorded on the storage element.

Thereafter, when this magazine is loaded in the disk device again, the identification code of the magazine is read in first when the magazine drive software is started, the database corresponding to the identification code is extracted from the storage section. A disk selecting/driving operation or the like is performed on the basis of the database.

When any disk in the magazine is exchanged, and the magazine drive software is started, an operation for updating recorded contents in the storage element or the recording region of the disk is performed. With this operation, the discrimination of the disks and the reading of the contents information are performed again, new information is converted into a database, and the data base is stored in the storage section together with the identification code of the magazine.

<Means for Achieving Third Object>

According to the present invention, a disk discriminating method in a disk device in which a magazine having both of a recording possible disk and a reproducing-only disk which can be stored in the magazine is characterized in that respective disks are discriminated on the basis of information recorded on the loaded magazine to check whether the disks in the magazine be recording possible disks or reproducing-only disks, each disk is drawn from the magazine after the discrimination, and the type of the corresponding disk is discriminated by at least one method selected from detection of a reflectance of a recording surface of the disk, detection of a thickness of a substrate in which the recording surface of the disk is formed, and reading of signals recorded on the disk.

For example, when trays on which disks are placed can be drawably stored in the magazine, identification information representing whether the corresponding disk be a recording possible disk or a reproducing-only disk is added to each tray.

Information representing whether the disks stored in the magazine be recording possible disks or reproducing-only disks may also be recorded on a storage section or a recording section arranged on the case of the magazine.

In the present invention described above, RAM disks and ROM disks are mixed and stored in a magazine. In addition, DVD-RAMs and PDs (Power Disks) are mixed and used as the RAM disks, and CDs, DVD-ROMs, and the like are mixed and used as the ROM disks.

The disk device is designed to recognize, in advance, whether each disk in the magazine be a RAM disk or a ROM disk when the magazine is loaded in the disk device. After this recognition, the type of each RAM disk or the type of each ROM disk is recognized, or the type of a disk belonging to at least one of the systems of the RAM disk and the ROM disk.

In the discrimination for checking whether each disk be a RAM disk or a ROM disk, when a plurality of trays are drawably stored in, e.g., a magazine, and disks are placed on the trays, respectively, identification information representing whether a disk be a RAM disk or a ROM disk is added to each tray. This identification information is obtained by detecting whether a reflective surface be formed on a tray, whether an identification projection or an identification recessed portion be formed on a tray, or the like.

Identification information representing whether each of disks in a magazine be a ROM disk or a RAM disk may also be stored in or recorded on the case of the magazine. For example, a storage element such as a small-capacity IC memory may be attached to the case of the magazine, and each disk may be discriminated on the basis of information extracted from the storage element to check whether the disk be a RAM disk or a ROM disk. Thereafter, the detailed type of each disk may be determined.

A bar code, a several-bit identification projection, an identification recessed portion, or an identification terminal may also be arranged on the case of the magazine, thereby recording information representing whether each disk be a RAM disk or a ROM disk. Identification information representing whether each disk be a RAM disk or a ROM disk may be written in a predetermined region of a RAM disk in the magazine, and the disk device may be designed such that the RAM disk must be accessed in first when the magazine is loaded, thereby loading the information.

As a method of discriminating the type of each disk after the disk is discriminated to check whether the disk be a RAM disk or a ROM disk, at least one method selected from detection of the reflection of the recording surface of the disk, detection of the thickness of a substrate in which the recording surface of the disk is formed, and reading of signals recorded on the disk is used. The reading of signals is performed in such a manner that TOC, FAT, and other data recorded on the disk are reproduced to detect whether the data can be demodulated by a predetermined modulation scheme. The reading is also performed by the following method. That is, detection light from an optical head is scanned in the radial direction of the disk, and a track pitch or the like is detected by a focus error detector.

Preferably, contents information (Volume Descriptor) recorded in a TOC region of each disk or contents information recorded in a FAT region are converted into a database together with disk type information, and the database is recorded on the storage element or the predetermined disk.

According to the present invention, each disk is discriminated in first to check whether the disk be a RAM disk or a ROM disk when a magazine in which plural types of disks are stored is loaded, and then the type of the corresponding disk is discriminated. For this reason, discrimination of the types of disks can be easily and correctly performed. A problem that a laser beam which is adversely affects a recording surface is erroneously irradiated thereon or the like does not easily arise.

DESCRIPTION OF THE PREFERRED EMBODIMENT

Figure 1:
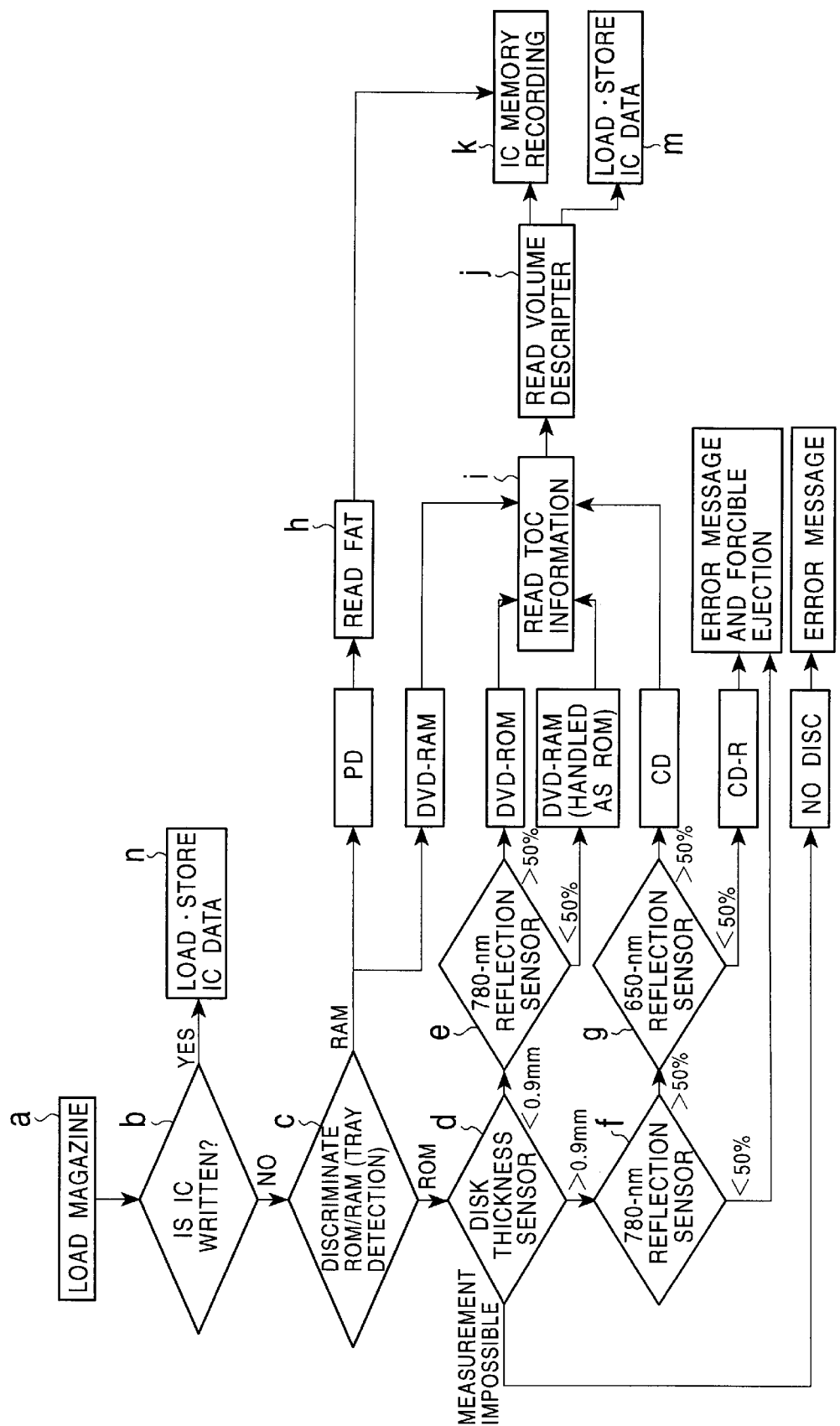
FIG. 1 is a flow chart showing a disk discriminating method according to the present invention.
Figure 2:
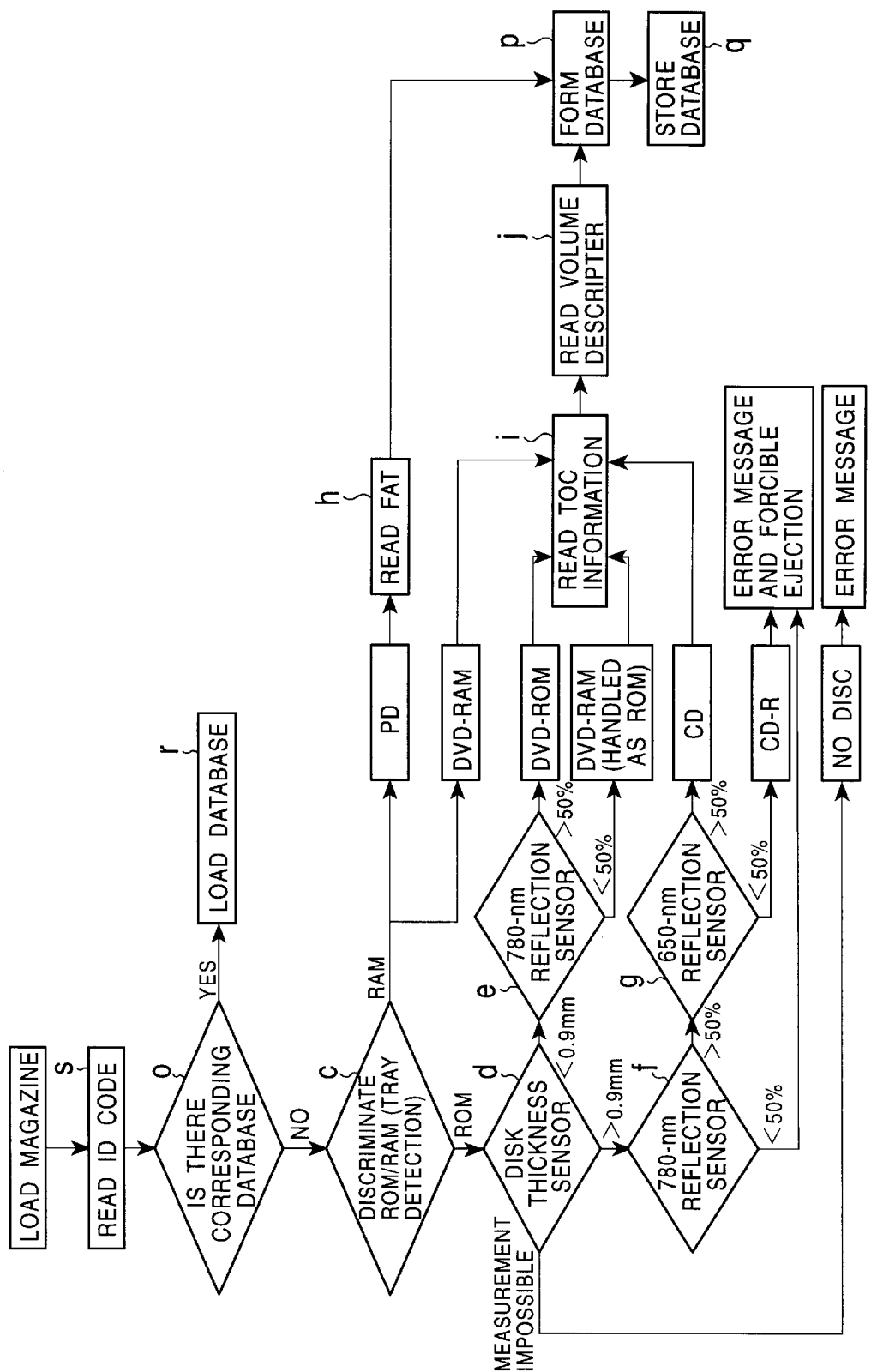
FIG. 2 is a flow chart showing another disk discriminating method.
Figure 3:
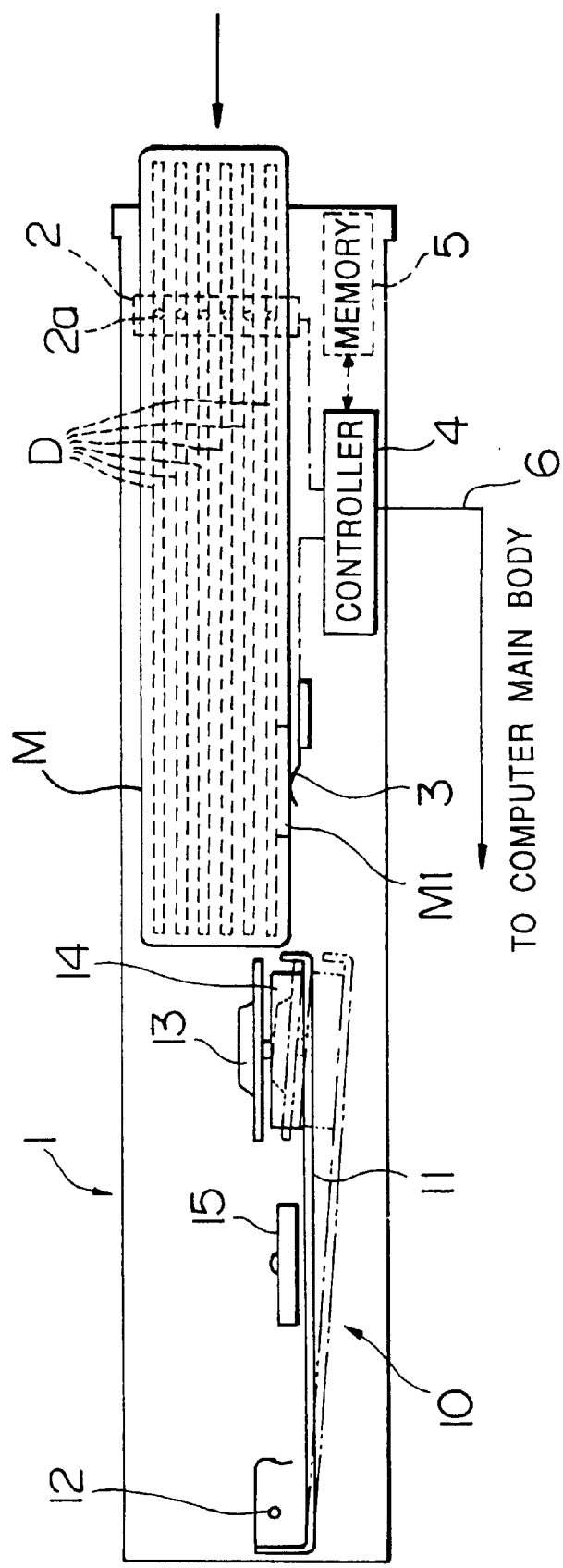
FIG. 3 is a side view showing a disk drive device.
Figure 4:
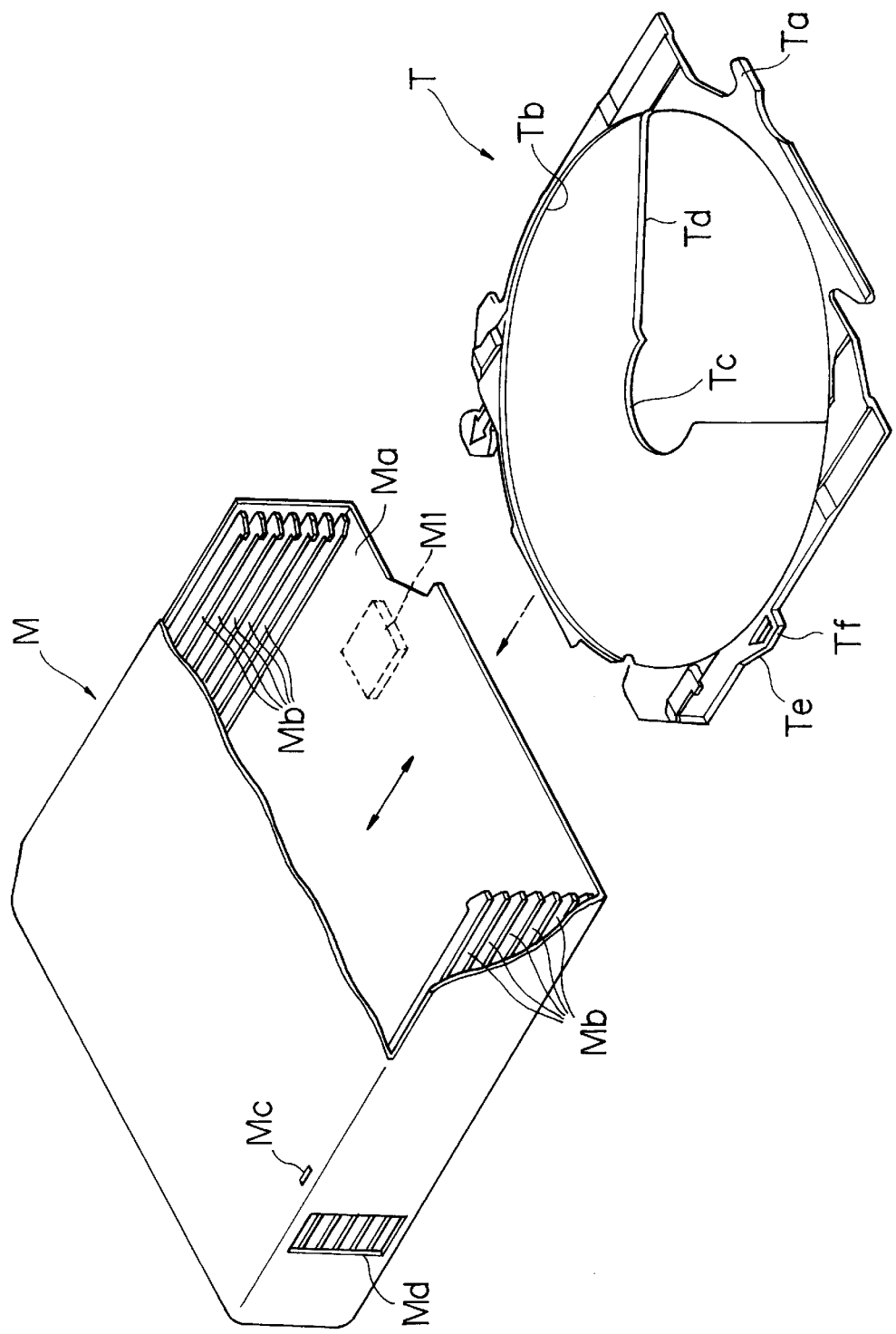
FIG. 4 is an exploded perspective view of a disk magazine.
Figure 5:
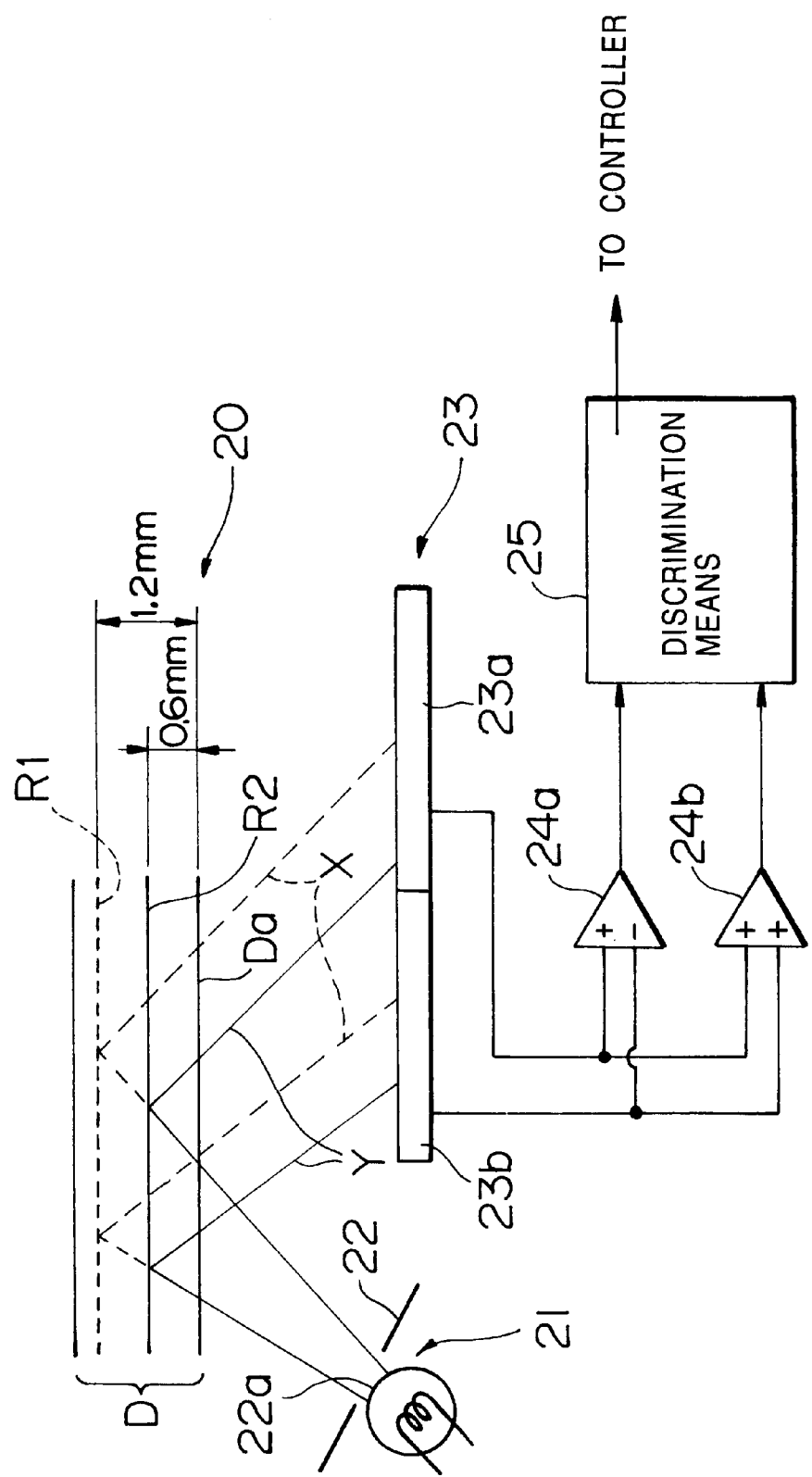
FIG. 5 is a side view showing an example of a disk discriminating device.

FIGS. 1 and 2 are flow charts showing disk discriminating methods according to the present invention, FIG. 3 is a side view showing an arrangement of a disk device, FIG. 4 is an perspective view of a magazine loaded in the disk device, and FIG. 5 is a side view showing an example of a disk discriminating device arranged in the disk.

In a magazine (or a disk package) M shown in FIG. 4, sliding recessed portions Mb are formed on both the inner sides of a case Ma consisting of a synthetic resin, and plural trays T are slidably arranged in the sliding recessed portions Mb. Hooks Ta are integrally formed at the distal end of each tray T. When a disk selecting-driving mechanism 10 in the disk drive device selects a tray, a drawing member in the disk selecting-driving mechanism 10 is hooked by the hook Ta, and the tray T selected by the drawing member is drawn from the magazine M.

A circular recessed portion Tb having a diameter slightly larger than the diameter (12 cm) of the disk is formed on the upper surface of the tray T, and a disk D is placed on the recessed portion Tb. A notch Tc which causes the central hole of the disk D to be exposed and a fan-shaped notch Td which is connected to the notch Tc and causes the recording surface of the disk D to be exposed downward are formed in the central portion of the recessed portion Tb.

In the magazine M, reproducing-only ROM disks and recording possible RAM disks are mixed and stored. A tray T on which a RAM disk on which information can be recorded is placed has a projection Te on a side of the tray T, and the projection Te is hooked on a lock mechanism in the magazine M, so that the tray T cannot be drawn. A small projection Mc for canceling a lock is formed on a side of the upper surface of the magazine M. When the magazine M is loaded into the disk device, the small projection Mc is pressed, so that the tray T on which a RAM disk is placed can be drawn. The projection Te is not formed on the tray T on which a ROM disk is not placed, and the tray T can be always manually drawn. When the disk device is designed such that a tray T on which a RAM disk is placed cannot be unexpectedly drawn, the recording surface of the RAM disk can be protected.

On the surface of the projection Te of the tray T on which the RAM disk is placed, a reflective surface Tf on which a reflective film is formed or on which a reflective film is adhered is formed. A detection window Md is opened in a side of the magazine M, and the reflective surface Tf appears from the detection window Md while the tray T is stored in the magazine M. A tray on which a ROM disk is placed does not have the projection Te and the reflective surface Tf.

An IC memory M1 serving as a storage element is attached to the bottom surface of the case of the magazine M.

In a disk device shown in FIG. 3, the magazine M is loaded into a housing 1 from the right in FIG. 3. In the housing 1, an optical detection device 2 opposing the detection window Md of the magazine M shown in FIG. 4, and photoreflectors 2a whose number is corresponding to the number of trays in the magazine M are arranged on the optical detection device 2. When the magazine M is loaded, the photoreflectors 2a oppose the side surfaces of the trays T through the detection window Md, respectively. Therefore, when a tray T dedicated to a RAM disk is arranged, the reflective surface Tf is detected, and a reflective surface is not detected on the tray T on which the ROM disk is placed. For this reason, it is possible to detect and identify whether the disk on the tray be a RAM disk or a ROM disk.

In the housing 1, a contact point 3 is formed. When the magazine M is loaded in the housing 1, the terminal of the IC memory M1 arranged on the bottom of the magazine M is brought into contact with the contact point 3. A controller 4 to which the optical detection device 2 and the contact point 3 are connected is arranged in the housing 1, and a memory (RAM) 5 for storing data is arranged in the housing 1. The controller 4 in this disk device is connected to the CPU of a host computer through a BUS line 6.

A disk selecting-driving mechanism 10 is arranged in the housing 1. The disk selecting-driving mechanism 10 can be moved upward and downward in FIG. 3 to select any tray in the magazine M. A drive chassis 11 arranged in the disk selecting-driving mechanism 10 can be rocked on a support shaft 12 serving as a fulcrum. By this rocking operation, a disk on a drawn tray is clamped. On the drive chassis 11, a turntable 13 which is fitted in the central hole of the disk D to clamp it, a spindle motor 14 for rotationally driving the turntable 13, and an optical head 15 are arranged. This optical head 15 has a structure in which objective lenses which are different in numerical aperture can be switched depending on the types of disks, or the numerical aperture of an objective lens can be switched depending on the types of disks.

In the disk selecting-driving mechanism 10, the drawing member hooked on the hook Ta of the tray T to draw the tray T and a drawing drive section for driving the drawing member.

In addition, a disk discriminating device 20 shown in FIG. 5 is mounted on the drive chassis 11 or the optical head 15 of the disk selecting-driving mechanism 10.

Referring to FIG. 5, a disk clamped on the turntable 13 of the disk selecting-driving mechanism 10 is represented by reference symbol D. Reference symbol Da denotes the surface of the disk. If the disk D is a CD, a CD-R, or a PD, a substrate located between a recording surface R1 and the disk surface Da has a thickness of 1.2 mm. If the disk D is a DVD-RAM or a DVD-ROM, a substrate located between a recording surface R2 and the disk surface Da has a thickness of 0.6 mm. Even if the disk D is any disk, the disk surface Da is supported on the same surface of the turntable. For this reason, in the disk device, the recording surface R1 and the recording surface R2 have different height positions, respectively.

The disk discriminating device having one light source 21 is shown in FIG. 5. However, the light source 21 is constituted by two light sources which emit lights having different wavelengths. The wavelength of the light emitted from one light source is 780 nm or approximately 780 nm, and the wavelength of the light emitted from the other light source is 650 nm or approximately 650 nm. Both the light sources are switchably controlled such that the light sources emit lights at different times. A through hole 22a opened in an aperture means 22 located in front of the light source 21 is a slit or a square or circular hole which extends in a direction perpendicular to the paper surface to have a predetermined opening width and a length larger than the opening width. Light transmitted through the through hole 22a is obliquely irradiated on the surface of the disk D.

At a position where light irradiated from the light source 21 and reflected from the recording surface R1 or R2 of the disk D, a light-receiving means 23 is arranged. The light-receiving means 23 has two light-receiving regions 23a and 23b which are divided in the inclining direction of the reflected light.

As an electric circuit arrangement to which the light-receiving means 23 is connected, a subtraction means 24a for calculating a difference between a photoelectric-converted output obtained by the light-receiving region 23a and a photoelectric-converted output obtained by the light-receiving region 23b and an addition means 24b for adding the photoelectric-converted outputs obtained by both the light-receiving regions 23a and 23b to each other are arranged. A discriminating means 25 to which the outputs from the subtraction means 24a and the addition means 24b are input is arranged. A disk discriminating output discriminated by the discriminating means 25 is given to the controller 4 in the housing 1 of the disk device shown in FIG. 3. The discriminating means 25 may be constituted by part of the controller 4.

Of light flex received by the light-receiving means 23, reference symbol X denotes a reflected light flux from the recording surface R1 of a disk including a substrate having a thickness of 1.2 mm, and reference symbol Y denotes a reflected light flux from the recording surface R2 of a disk including a substrate having a thickness of 0.6 mm.

In this disk discriminating device 20, the difference between the thicknesses (1.2 mm and 0.6 mm) of the substrates can be discriminated. In addition to this, the difference between the optical reflectances of the recording surfaces R1 and R2 can be discriminated. Furthermore, the difference between the reflectances of the recording surfaces R1 and R2 with respect to light having a wavelength of 780 nm or approximately 780 nm and the difference between the reflectances with respect to light having a wavelength of 650 nm or approximately 650 nm can be discriminated.

When the disk including a substrate having a thickness of 1.2 mm is loaded, and detection light having any one of the wavelengths is irradiated from the light source 21, the light is reflected by the recording surface R1 located 1.2 mm above the disk surface Da. The reflected light X is received by both the light-receiving region 23a and the light-receiving region 23b. When the disk including a substrate having a thickness of 0.6 mm is loaded, and detection light having the wavelength equal to that in a state wherein the 1.2-mm disk is loaded is irradiated from the light source 21, the light is reflected by the recording surface R2 located 0.6 mm above the disk surface Da. The reflected light Y is received by both the light-receiving region 23a and the light-receiving region 23b.

Depending on the difference between the thicknesses of the substrates, i.e., depending on the difference between the heights from the disk surface Da to the recording surfaces R1 and R2, the reflected light X and the reflected light Y are different from each other in a range in which a light flux is irradiated on the light-receiving means 23. Therefore, the reflected light X and the reflected light Y are different from each other in a ratio of an amount of light received by the light-receiving region 23a to an amount of light received by the light-receiving region 23b.

Therefore, when the subtraction means 24a calculates the difference between the amount of light received by the light-receiving region 23a and the amount of light received by the light-receiving region 23b, the discriminating means 25 can discriminate the height from the disk surface Da to the recording surface to check whether the height be 1.2 mm or 0.6 mm. For example, in the discriminating means 25, a mean value (difference between amounts of light when the height is 0.9 mm) between the difference between the amount of light received by the light-receiving region 23a and the amount of light received by the light-receiving region 23b when the height of the recording surface is 1.2 mm and the difference between the amount of light received from the light-receiving region 23a and the amount of light received by the light-receiving region 23b when the height of the recording surface is 0.6 mm is assumed as a threshold value. When the threshold value is compared with an output from the subtraction means 24a, the thicknesses of the substrates can be discriminated.

After the thicknesses of the substrates are discriminated, detection light of 780 nm is given from the light source 21 or detection light of 650 nm is given, and the difference between the reflectances of the recording surfaces R1 and R2 with respect to respective wavelengths is detected. In this manner, more detailed disk discrimination can be performed. The amounts of reflected light can be detected by an output from the addition means 24b for calculating the sum of the amounts of light received by both the light-receiving regions 23a and 23b.

A disk discriminating method using the disk device in which the magazine M is loaded will be described below with reference to FIG. 1.

The magazine M is loaded in the disk device (step (a)), magazine drive software is started by an Icon on the display screen of a computer. Immediately after the start, the IC memory M1 on the bottom of the magazine M is accessed through the contact point 3 shown in FIG. 3. When the magazine M is in an initial state, and no database is stored in the IC memory M1, it is displayed on the display that the magazine M is a magazine in an initial state, and a display representing whether a discriminating operation for the disks in the magazine M appears be started (step (b)). In response to this display, when a mark is adjusted to "YES", and an input button (e.g., a click button of a mouse) is pressed, the disk discriminating operation is started. The following disk discriminating operation is executed by the process of the controller 4 arranged in the disk device. Also, each detection output may be sent to the CPU of the host computer through the BUS line 6, and the following disk discriminating operation may be executed by the CPU.

In step (c) in this disk discriminating operation, an output from the optical detection device 2 shown in FIG. 3 is given to the controller 4. When a tray T dedicated to a RAM disk is stored in the magazine M, the reflective surface Tf formed on the side surface of the tray T appears from the detection window Md on the side surface of the magazine M as shown in FIG. 4, and reflected light of light spontaneously emitted from the photoreflector 2a is detected. At this time, trays dedicated to the RAM disk and trays dedicated to the ROM disk can be known in plural trays.

After detection information in the optical detection device 2 is given to the controller 4, the disk selecting-driving mechanism 10 is started by a control operation of the controller 4 to select a disk in the magazine M. The trays are sequentially drawn by the disk selecting-driving mechanism 10 one by one.

When the reflective surface Tf of the tray T is detected by the optical detection device 2, a disk placed on this tray T is determined as a RAM disk. However, the RAM disk may be a PD (power disk) or a DVD-RAM (digital-versatile-disk-RAM). In this case, a tray dedicated by the RAM disk is drawn, a disk is loaded on the turntable 13, and data recorded on the disk is read by the optical head 15, so that the disk is discriminated on the basis of the recording format to check whether the disk be a PD or a DVD-RAM. The optical head 15 has a structure in which objective lenses can be switched, or the numerical aperture of an objective lens can be switched. If the optical detection device 2 determines that a RAM disk is placed on the tray, the objective lens in the optical head 15 is switched to an objective lens suitable for a PD or a DVD-RAM at any time, or the numerical aperture of the objective lens is switched, so that the data is read.

When it is determined on the basis of the output from the optical detection device 2 in step (c) that the reflective surface Tf of the tray T is not detected, this tray T is determined as a tray dedicated to the ROM disk.

When the tray T dedicated to the ROM disk is drawn by the disk selecting-driving mechanism 10, and the disk D is loaded on the turntable 13, the light source 21 of the disk discriminating device 20 shown in FIG. 5 obliquely irradiates detection light on the disk surface. Depending on whether the reflected light be X or Y, the differences of amounts of light received by the light-receiving regions 23a and 23b are different from each other. In the discriminating means 25, a subtraction output from the subtraction means 24a is compared with a threshold value corresponding to a detection output when the thickness of the substrate corresponds to 0.9 mm. If the thickness of the substrate of the disk calculated by the subtraction output is smaller than 0.9 mm, it is determined that the disk placed on the tray T is a DVD.

Here, the tray T having a projection Te in the magazine M shown in FIG. 4 is dedicated to the RAM disk. As described above, the projection Te is locked by the lock mechanism in the magazine M to prevent this tray from being manually drawn. However, when the projection Te appearing from the detection window Md of the magazine M is pressed with a tool such as a screwdriver to break or transform the projection Te, even the tray dedicated to the RAM disk can be freely drawn out of the magazine M. In this system, when the tray T is drawn by breaking or transforming the projection Te for some reason, thereafter, the recording surface of the DVD-RAM may stain, and writing precision may be degraded. For this reason, even if a DVD-RAM is placed on this tray T, after the Te is broken, the DVD-RAM is handled as a ROM on which recording is not performed. The disk device is designed such that the optical detection device 2 cannot detect the reflective surface Tf when the projection Te is broken or transformed.

Therefore, if the reflective surface Tf is not detected in step (c) in FIG. 1 so that the tray is determined as a tray dedicated to the ROM disk, and if it is determined in step (d) that the substrate of the disk has a thickness smaller than 0.9 mm (0.6 mm), a disk on this tray T may be a DVD-ROM or a DVD-RAM which is handled as a ROM described above. For this reason, in this case, in step (e), detection light having a wavelength of 780 nm is irradiated from the light source 21 shown in FIG. 5, and a reflectance is examined on the basis of a detection output from the addition means 24b. When the reflectance is higher than 50%, the disk on this tray is discriminated as a DVD-ROM. When the reflectance is lower than 50%, the disk on this tray is discriminated as a DVD-RAM handled as a ROM.

If the thickness of the disk is discriminated such that the thickness is larger than 0.9 mm and equal to 1.2 mm in step (d), in step (f), detection light having a wavelength of 780 nm is irradiated from the light source 21 shown in FIG. 5, and a reflectance is detected on the basis of an addition output from the addition means 24b. If it is determined that the reflectance exceeds 50%, the light from the light source 21 is switched in step (g) to give detection light having a wavelength of 650 nm to the disk. When the reflectance at this time exceeds 50%, the disk placed on the tray dedicated to the ROM disk is discriminated as a CD. However, when the reflectance with respect to the detection light having a wavelength of 650 nm is lower than 50% in step (g), the disk is discriminated as a CD-R which is erroneously placed on the tray dedicated to the ROM disk. An error message is displayed on the display of the host computer, and the tray on which the disk is placed is forcibly returned into the magazine M.

When the thickness of the substrate of the disk cannot be detected in step (d), it is determined that no disk is placed on the tray, and an error message is displayed on the display. If it is determined that the reflectance with respect to detection light having a wavelength of 780 nm is lower than 50% in step (f), it is determined that a disk which is not supposed to be used is placed on the tray, an error message is displayed as described above, and the tray is forcibly returned into the magazine M.

Immediately after the types of the disks arranged on the trays T in the magazine M are discriminated by the discriminating means 25 as described above, information of every disk is read by an optical disk. When the disk is a PD, FAT is read (step (h)). When the disk is a DVD-RAM, a DVD-ROM, a DVD-RAM handled as a ROM, or a CD, TOC information is read (step (i)). In addition, a Volume Descripter is read as contents information (step (j)).

As described above, all the trays T in the magazine M are drawn, and discrimination for the types of the disks and reading of the contents information are performed. However, the type information and contents information of each disk are written in the memory 5 in the disk device shown in FIG. 3 at any time, and are converted into a database in a predetermined format. All the trays are drawn, and the type information and the contents information are written in the memory 5 in step (m) to be converted into a database. Thereafter, in step (k), the recorded contents in the memory 5 are transferred to the IC memory M1 arranged on the bottom of the magazine M to be written in the IC memory M1. In this writing operation, only the disk type information may be transcribed in the IC memory M1.

After data is recorded on the IC memory M1 of the disk device in step (m), the data is sent to the host computer through the BUS line 6, and an Icon related to identification of each disk is displayed on the display. When the Icon of a specific disk is selected, and an operation button (click button of the mouse) is pressed, the contents information of the disk (FAT information or Volume Descripter) is displayed on the display. When the Icon corresponding to a specific disk is selected, the tray of the selected disk is drawn from the magazine M, software related to the disk is started, and a reading/recording operation of information from/on the disk is made possible.

In step (k), after the disk type information and the contents information are converted into a database, the database is recorded on the IC memory M1 of the magazine M. However, when the magazine M has no IC memory M1, in step (k), a tray T on which a predetermined programmable disk, e.g., a DVD-RAM is placed is drawn, and the disk type information and the contents information are recorded in a predetermined recording region of the disk.

When the magazine M including the IC memory M1 (or predetermined disk) in which the type information and the contents information are written as described above is removed from the disk device, and the magazine is loaded in the disk device again, in step (b), the IC memory M1 is accessed from the controller 4, and it is determined that write information is in the IC memory. In step (n), the data recorded on the IC memory M1 is loaded on the memory 5 in the disk device. In this manner, the information can be accessed from the CPU of the computer, and an Icon related to the type of each disk is displayed on the display. In addition, contents information can be displayed, and, immediately, a reproducing operation or a recording operation can be performed to the disks.

When the magazine M has no IC memory M1, and type information and contents information are recorded on a specific disk, the recorded disk is reproduced in step (b), so that the identification information or contents information recorded on the disk is read to be stored in the memory 5.

FIG. 2 is a flow chart showing another processing method.

Referring to FIG. 2, the ID code of a magazine is recorded on the small-capacity IC memory M1 installed on the bottom surface of the case of the magazine M or an identification recording means, attached to the case in place of the IC memory, for a bar code or the like, so that different magazine have different code numbers, respectively. As another identification recording means, several-bit identification holes may be formed in the magazine M. The presence/absence of the holes may be detected by a contact type or non-contact type detecting member arranged on the disk device side. When an ID mark such as a bar code is added, the ID mark may be read by a scanner arranged in the housing 1.

The ID code of the loaded magazine M is read in step (s) shown in FIG. 2, and a database corresponding to the ID code is discriminated to check whether the database be stored in the memory 5 in step (o). When the database is not stored, identification for checking whether the tray be a tray for a RAM disk or a tray for a ROM disk and an identifying operation for the respective disks are performed in the steps following step (c). After the discrimination for the types of the disks and reading of the contents information, the identification information of the disks and contents information such as TOC are converted into a database together with the identification code (ID code) of the magazine in step (p), and the database is stored in the memory 5 in step (q), otherwise, the data converted into the database are stored in the storage section of the host computer.

Although the database may be constituted by the identification code of the magazine and the disk type information, the contents information is preferably added.

When the magazine M in which the disk discriminating operation and the storage of the database are completed is loaded in the disk device again, in step (o) in FIG. 2, the memory 5 is accessed to confirm that the database corresponding to the ID code of the magazine is stored. In this case, a discriminating operation performed in steps following step (c) is not performed, and the database stored in the memory 5 is loaded to be stored in the host computer, so that the disk device can be driven depending on the types of the respective disks.

In the example shown in FIG. 1, all the pieces of identification information of the disks are stored in the IC memory M1. In FIG. 2, an ID code for identifying a magazine is stored in the IC memory M1 or the like. However, only identification information representing whether each disk be a ROM disk or a RAM disk may be stored in the IC memory M1 in advance, or only information representing whether the disks in the magazine be ROM disks or RAM disks may be stored in the memory 5 in correspondence with the ID code, recorded on the IC memory M1, for identifying a magazine. In this case, in step (c) in FIGS. 1 and 2, it is determined on the basis of the stored contents in the IC memory M1 or the stored contents in the memory 5 whether a specific disk in the magazine be a ROM disk or a RAM disk. Thereafter, the types of the respective disks are discriminated in steps following step (d).

The present invention achieves the following advantages.

1) In a disk device in which a magazine in which ROM disks and RAM disks are mixed and stored is loaded, when the magazine is loaded, the types and contents information of the disks in the magazine are detected and recorded on a storage section of the magazine. For this reason, when the magazine is loaded again, the information is read immediately, and disk drive can be started.

2) In a disk device in which a magazine in which ROM disks, RAM disks, and the like are mixed and stored is loaded, when the magazine is loaded, identification of the magazine is performed, and a database corresponding to the identification code can be extracted, so that the types and contents information of the disks in the magazine can be recognized. Therefore, when the magazine is loaded again, disk drive can be started immediately.

3) In a disk device in which a magazine in which ROM disks and RAM disks are mixed and stored is loaded, when the magazine is loaded, after identification is performed to check whether the disks be ROM disks or RAM disk, a discriminating operation for the respective disks is started. For this reason, the types of the disks can be discriminated at high precision. A problem that a laser beam which adversely affects the recording surface of the disk is erroneously irradiated on the recording surface does not arise.

What is claimed is:

1. A disk discriminating method in a disk device loaded with a magazine that can store plural types of disks, characterized in that each disk is drawn from said magazine, a type of each disk is discriminated by at least one method selected from the group consisting of (i) detection of a reflectance of a recording surface of the disk, (ii) reading of signals recorded on the disk, and (iii) detection of a thickness of a substrate in which the recording surface of the disk is formed, type information regarding the discriminated types of the respective disks is recorded on a storage section arranged in said magazine, and when the magazine is loaded next time, the type information on each disk is read from the storage section to determine the type of each disk stored in the magazine.

2. A disk discriminating method according to claim 1, wherein contents information recorded on the disk is read, and the contents information is preferably recorded on said storage section together with the type information of each disk.

3. A disk discriminating method according to claim 1, wherein said storage section is a storage element attached to said magazine.

4. A disk discriminating method according to claim 1, wherein a recording region of a recordable disk stored in said magazine is partially used as said storage section.

5. A disk discriminating method according to claim 1, wherein, after the type information is recorded on said storage section, said storage section is accessed at first when said magazine is loaded, and a disk selecting operation is performed on the basis of the type information stored in said storage section.

6. A disk discriminating method for a disk device loaded with a magazine that can store disks of both recordable type and reproduction-only type, comprising the steps of:

(a) identifying the disks as to whether they are of recordable type and reproduction-only type by using identification information stored in the magazine without optically examining the disks; and (b) further discriminating types of any disks identified as being of reproduction-only type in above step (a) by optically examining the disks so identified in such a manner as to detect for each of the disks a reflectance of its recording surface and a thickness of its substrate.

7. A disk discriminating method according to claim 6, wherein trays on which disks are placed can be drawably stored in said magazine, and, an identifier is added to each tray that indicates whether a disk placed thereon is of recordable type or reproduction-only type.

8. A disk discriminating method according to claim 6, wherein information indicating whether the respective disks in the magazine are of recordable type or reproduction-only type is recorded on a storage section or a recording section arranged on the case of said magazine.

* * * * *